(12) United States Patent
Pasupuleti et al.

(10) Patent No.: US 10,149,343 B2
(45) Date of Patent: Dec. 4, 2018

(54) USE OF BASEBAND TRIGGERS TO COALESCE APPLICATION DATA ACTIVITY

(71) Applicant: Apple Inc., Cupertino, CA (US)

(72) Inventors: Srinivas Pasupuleti, San Jose, CA (US); Sarma V. Vangala, San Jose, CA (US); Franco Travostino, San Jose, CA (US); Padmavathy Bhooma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 14/708,346

(22) Filed: May 11, 2015

(65) Prior Publication Data

US 2016/0338036 A1 Nov. 17, 2016

(51) Int. Cl.
*H04W 76/27* (2018.01)
*H04W 52/02* (2009.01)
*H04W 72/08* (2009.01)

(52) U.S. Cl.
CPC ........... *H04W 76/27* (2018.02); *H04W 72/08* (2013.01); *H04W 52/0232* (2013.01);
(Continued)

(58) Field of Classification Search
CPC ............. H04W 72/048; H04W 72/085; H04W 52/0251; H04W 52/0232; H04W 52/0238; H04W 72/08; H04W 72/087; H04W 76/27; Y02D 70/00; Y02D 70/122; Y02D 70/1226; Y02D 70/1242; Y02D 70/1262; Y02D 70/1264; Y02D 70/142; Y02D 70/144; Y02D 70/146; Y02D 70/164; Y02D 70/168; Y02D 70/22; Y02D 70/26

See application file for complete search history.

(56) References Cited

U.S. PATENT DOCUMENTS 8,200,163 B2    6/2012  Hoffman
8,750,123 B1 *  6/2014  Alisawi ............ H04W 28/0284
                                                        370/231

(Continued)

FOREIGN PATENT DOCUMENTS

EP        2680182        5/2013
EP        2 838 304 A1   2/2015
WO        2015032048     3/2015

OTHER PUBLICATIONS

Office Action, German Patent Application 10 2016 206 944.6, dated Apr. 10, 2017, 12 pages.

*Primary Examiner* — Asad M Nawaz
*Assistant Examiner* — Kai Chang
(74) *Attorney, Agent, or Firm* — Meyertons Hood Kivlin Kowert & Goetzel, P.C.; Jeffrey C. Hood

(57) ABSTRACT

This disclosure relates to techniques for using wireless link information from baseband to trigger application data activity. According to some embodiments, wireless link information from baseband may be received at an application processor of a wireless device. The wireless link information may indicate whether the wireless link is in a connected state or an idle state. Network activity timing for one or more application network activity requests may be selected based at least in part on the wireless link information. The application network activity may be initiated for the one or more application network activity requests according to the selected network activity timing.

19 Claims, 5 Drawing Sheets

(52) U.S. Cl.
CPC .... *H04W 52/0238* (2013.01); *H04W 52/0251* (2013.01); *H04W 72/085* (2013.01); *H04W 72/087* (2013.01); *Y02D 70/00* (2018.01); *Y02D 70/1222* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/22* (2018.01); *Y02D 70/26* (2018.01)

(56) References Cited

U.S. PATENT DOCUMENTS

| | | | |
|---|---|---|---|
| 8,750,207 | B2 | 6/2014 | Jeong et al. |
| 8,824,424 | B2 * | 9/2014 | Hole ................. H04W 72/1257 370/336 |
| 8,837,313 | B2 * | 9/2014 | Adachi ............. H04W 52/0229 370/252 |
| 8,897,143 | B2 * | 11/2014 | Xu ...................... H04W 72/005 370/241 |
| 8,958,760 | B2 | 2/2015 | Mujtaba et al. |
| 9,414,404 | B1 * | 8/2016 | Travostino ........ H04W 72/1268 |
| 9,578,441 | B2 * | 2/2017 | Gerber ................ H04L 43/0876 |
| 2009/0325512 | A1 | 12/2009 | Granlund et al. |
| 2010/0069127 | A1 * | 3/2010 | Fiennes ............... H04W 52/028 455/574 |
| 2011/0086608 | A1 * | 4/2011 | Yamagishi ........... G08B 27/006 455/404.1 |
| 2012/0122511 | A1 * | 5/2012 | Antonio ............ H04W 52/0232 455/522 |
| 2012/0129564 | A1 | 5/2012 | De La Cropte De Chanterac |
| 2012/0182938 | A1 | 7/2012 | Mujtaba et al. |
| 2012/0208548 | A1 | 8/2012 | Park |
| 2012/0281536 | A1 | 11/2012 | Gell et al. |
| 2012/0281602 | A1 * | 11/2012 | Tsunekawa ......... H04W 72/085 370/280 |
| 2012/0324041 | A1 * | 12/2012 | Gerber .................... H04L 67/26 709/217 |
| 2013/0029708 | A1 | 1/2013 | Fox et al. |
| 2013/0208699 | A1 * | 8/2013 | Hakkinen ........... H04W 76/046 370/331 |
| 2013/0254256 | A1 * | 9/2013 | Fu ........................... H04L 67/10 709/201 |
| 2013/0272251 | A1 | 10/2013 | Schmidt et al. |
| 2013/0286913 | A1 | 10/2013 | Chanterac |
| 2013/0329551 | A1 * | 12/2013 | Brisebois .............. H04W 4/001 370/230 |
| 2013/0329556 | A1 | 12/2013 | Vangala et al. |
| 2013/0329637 | A1 * | 12/2013 | Kodali ................ H04W 76/046 370/328 |
| 2014/0056165 | A1 * | 2/2014 | Siomina ............... H04B 1/7083 370/252 |
| 2014/0064095 | A1 | 3/2014 | Li et al. |
| 2014/0064134 | A1 * | 3/2014 | Huang ................ H04W 76/068 370/253 |
| 2014/0219088 | A1 * | 8/2014 | Oyman ............ H04N 21/23439 370/231 |
| 2014/0254567 | A1 * | 9/2014 | Han ...................... H04W 56/00 370/336 |
| 2014/0269469 | A1 * | 9/2014 | Tran .................. H04W 52/0251 370/311 |
| 2014/0334369 | A1 | 11/2014 | Kaikkonen et al. |
| 2014/0357196 | A1 | 12/2014 | Mayor et al. |
| 2014/0364104 | A1 | 12/2014 | Wood et al. |
| 2014/0366041 | A1 | 12/2014 | Stanley-Marbell et al. |
| 2014/0366042 | A1 | 12/2014 | Chan et al. |
| 2015/0009815 | A1 | 1/2015 | Hsu et al. |
| 2015/0009816 | A1 | 1/2015 | Hsu et al. |
| 2015/0055594 | A1 * | 2/2015 | Nirantar .............. H04W 76/045 370/329 |
| 2015/0063212 | A1 | 3/2015 | Nirantar et al. |
| 2015/0080025 | A1 * | 3/2015 | Yamada ................ H04W 48/04 455/456.2 |
| 2015/0271755 | A1 * | 9/2015 | Karri ................. H04W 52/0229 370/252 |
| 2016/0095008 | A1 * | 3/2016 | Zhao .................. H04W 36/0083 370/252 |
| 2016/0105917 | A1 * | 4/2016 | Miao .................... H04W 76/046 370/329 |
| 2016/0234825 | A1 * | 8/2016 | Axmon .................. H04W 8/00 |
| 2016/0302100 | A1 * | 10/2016 | Kanamarlapudi .... H04L 1/1848 |

* cited by examiner

USE OF BASEBAND TRIGGERS TO COALESCE APPLICATION DATA ACTIVITY

FIELD

The present application relates to wireless devices, including to apparatuses, systems and methods for using baseband triggers and link quality to coalesce application data activity.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics and may use cellular connections in different ways. When multiple applications are active, it may be the case that those applications' networking activities are not coordinated with each other. This can lead to an unnecessarily large number of connections being created and inefficient use of those connections, which can have negative power use and/or performance implications. Accordingly, improvements in the field would be desirable.

SUMMARY

Embodiments are presented herein of apparatuses, systems, and methods for coalescing application data activities based on baseband triggers, link state, and/or link quality. Data from multiple applications may thus be coalesced (e.g., triggered to occur together, potentially including being triggered concurrently or triggered within a short timeframe).

According to the techniques described herein, wireless link metrics may be provided from a baseband processor of a wireless device to an application processor of the wireless device. The wireless link metrics may provide the application processor with information regarding the state and/or quality of one or more wireless links (such as a cellular link) of the wireless device. For example, the wireless link metrics may include an indication of whether a wireless link/type of interface is available or not (e.g., for data activity), an indication of whether a wireless link is in a connected state (e.g., radio resource control (RRC) connected) or an idle state (e.g., RRC idle), an indication of a link quality level of a wireless link, and/or any of various other possible wireless link metrics.

Application network activity requests, such as for foreground or background data transfers, may also occur at the application processor. For example, a networking entity executing on the application processor may receive such requests from one or more networking applications executing on the application processor when those networking applications wish to perform network activities.

The networking entity may choose when to initiate the requested network activities. Selection of timing for network activity initiation may be subject to one or more constraints. For example, different network activity requests may have different delay sensitivities. Some requested network activities (e.g., foreground activities) may be very delay sensitive (i.e., may not be very tolerant of delays), while other requested network activities (e.g., background activities) may be less delay sensitive (i.e., may be more tolerant of delays). As another example, different network activities may be of different scopes: some may include large data transfers, while others may include small data transfers.

As one of the considerations when selecting timing for network activity initiation, the networking entity may consider the wireless link metrics received from baseband. For example, if the wireless link is unavailable for data activity, it may not make sense to initiate any network activities, since there may be no interface available on which to perform those network activities. If the wireless link is available but in idle mode, the networking entity might (e.g., temporarily) refrain from initiating networking activities with sufficient delay tolerance in order to avoid triggering a state transition. If the wireless link is in connected mode and link quality is good, the networking entity might trigger initiation of any or all requested network activities (e.g., potentially including networking activities which were previously delayed), which may increase utilization of the already-established RRC connection and take advantage of the good link quality of that RRC connection. Note that while the above-described behaviors represent several examples of possible network activity timing selection based on wireless link information, any number of other behaviors may be implemented by such a networking entity based on available wireless link information in addition to or as alternatives to those just described.

Thus, according to the techniques described herein, it may be possible to coordinate multiple application networking activities to trigger at the same or nearly the same time. In other words, data for multiple applications may be coalesced based on baseband trigger conditions, such as the wireless link entering RRC connected mode. Such coalescing of connection triggers may reduce the number of radio resource control (RRC) state transitions (e.g., transitions between RRC connected and RRC idle) of a wireless link and maximize the utilization of those RRC connections. Furthermore, at least in some instances, it may be possible according to the techniques described herein to coalesce data for multiple applications and/or application networking activities in a manner that establishes RRC connections in advantageous conditions, such as by coalescing application data when link quality is good (e.g., as may be determined based on downlink channel conditions, estimated achievable throughput, and/or any of various other considerations), which may result in the application networking activities being performed in an efficient manner. This may provide improved performance and reduced power consumption, which may be beneficial to user experience.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
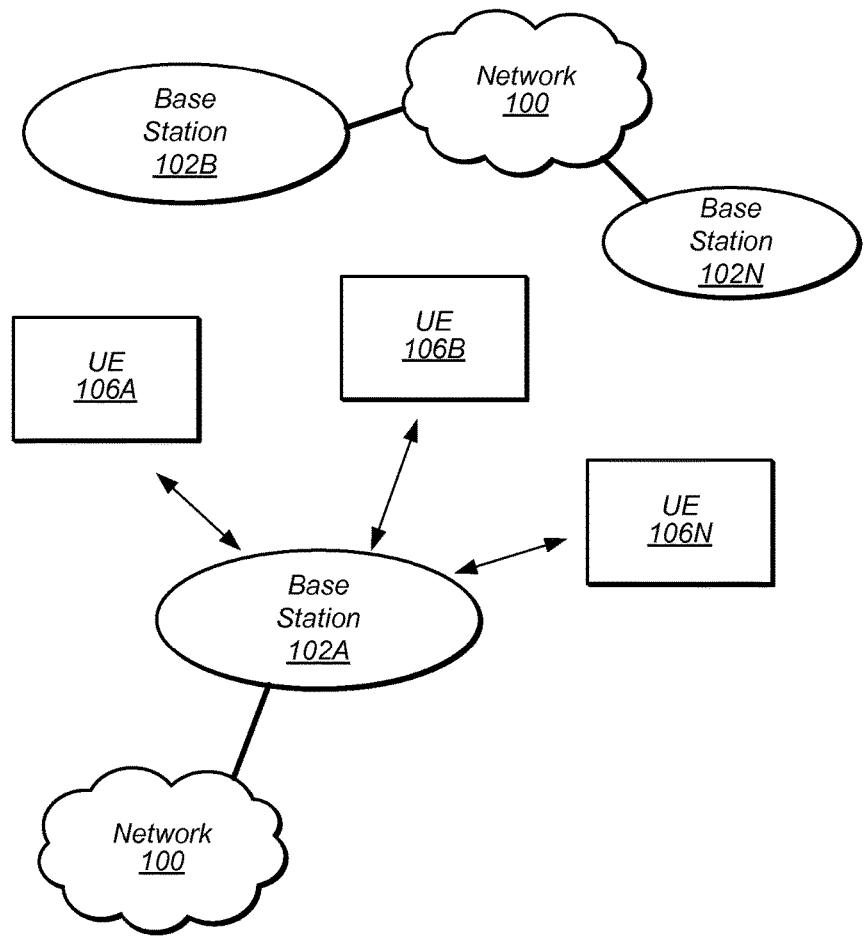
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
RRC: Radio Resource Control
RLC: Radio Link Control Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
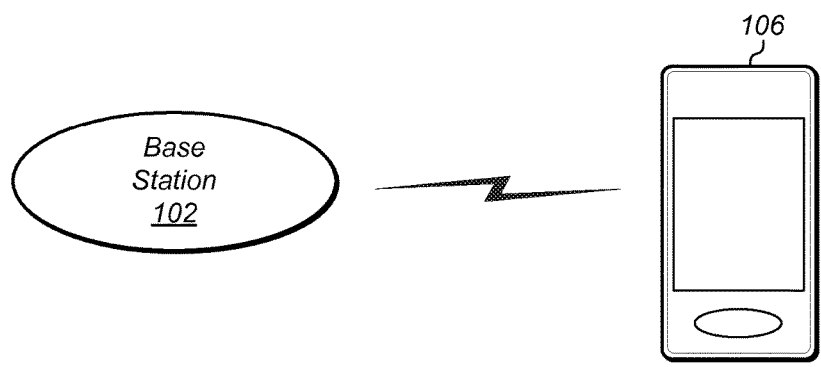
FIG. 2 illustrates a base station (BS) in communication with a user equipment (UE) device, according to some embodiments.
Figure 3:
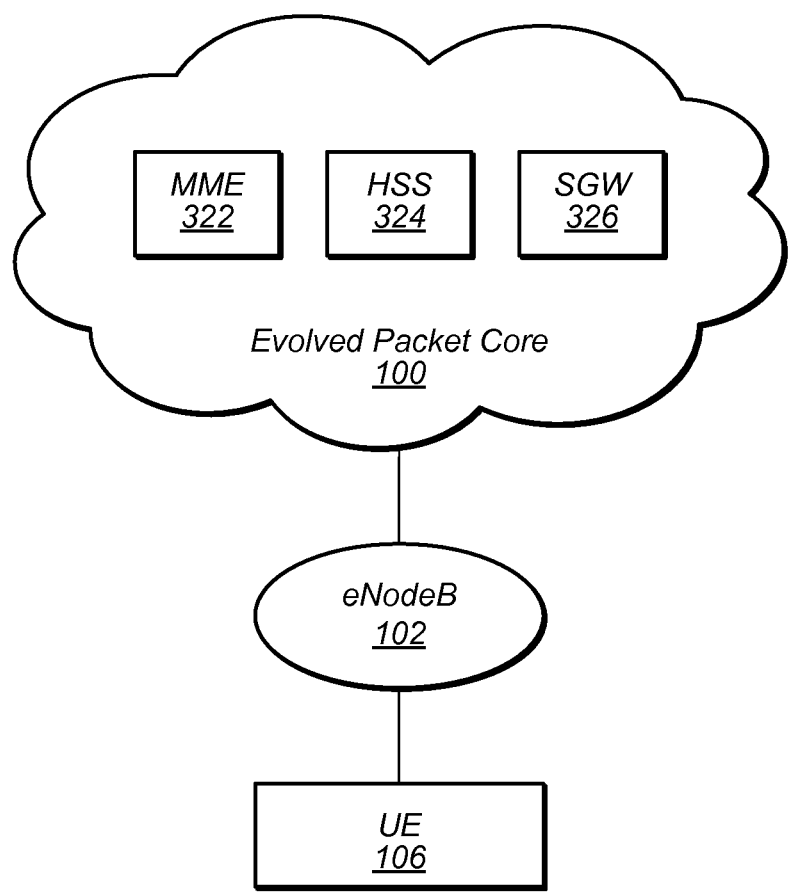
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
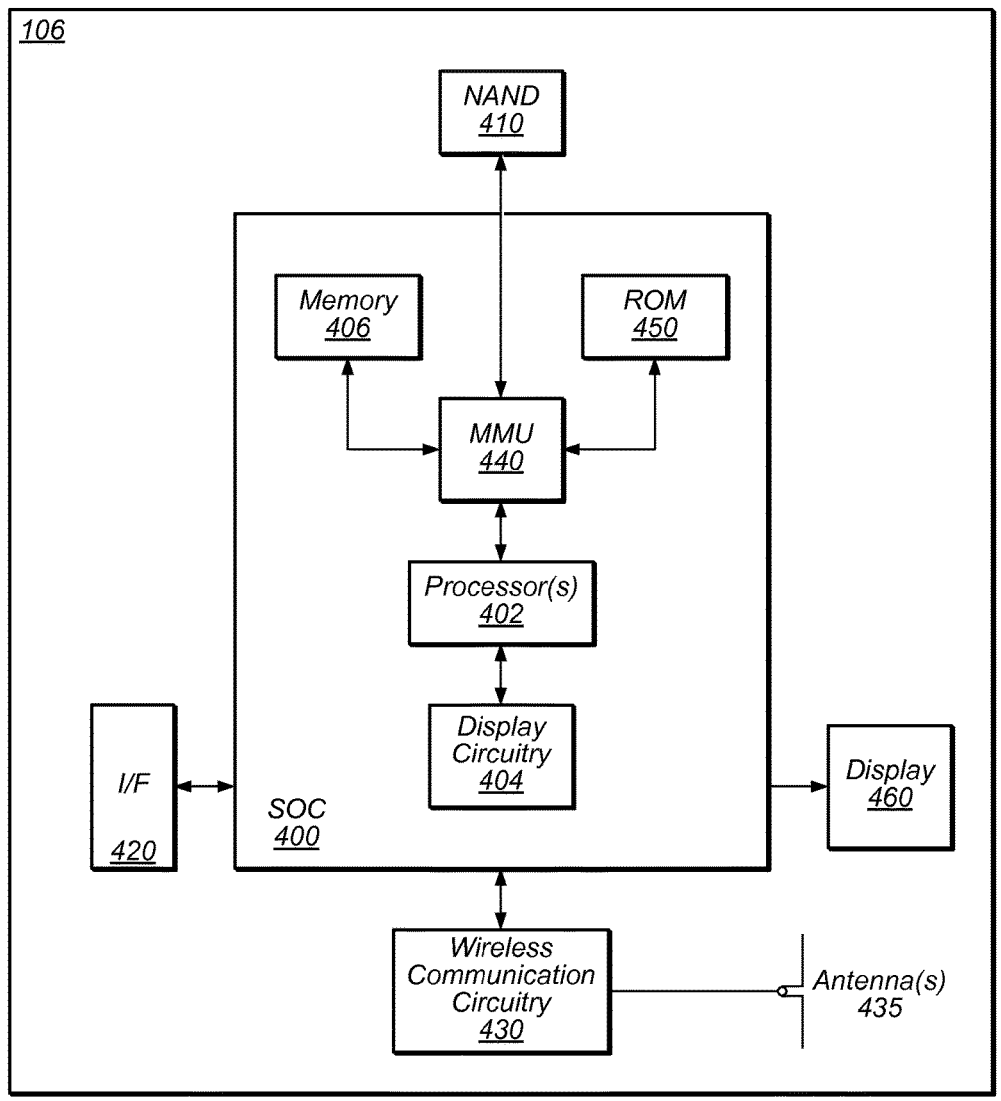
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
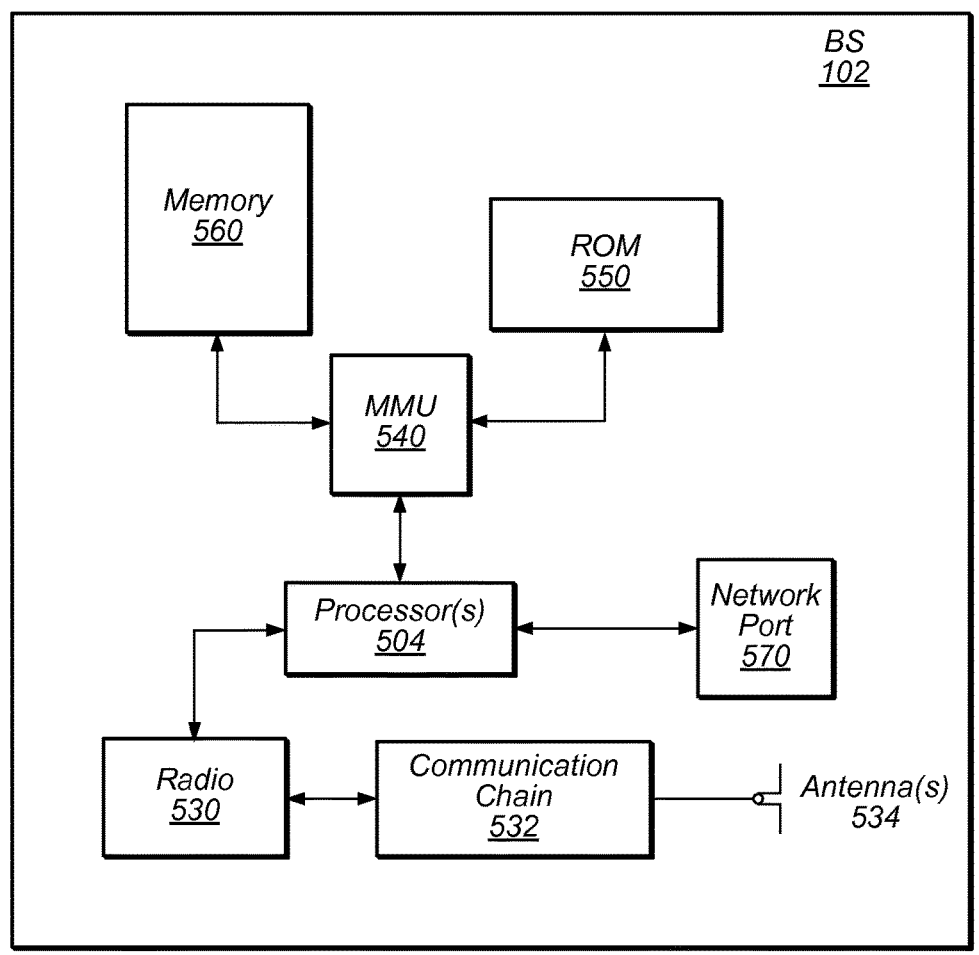
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
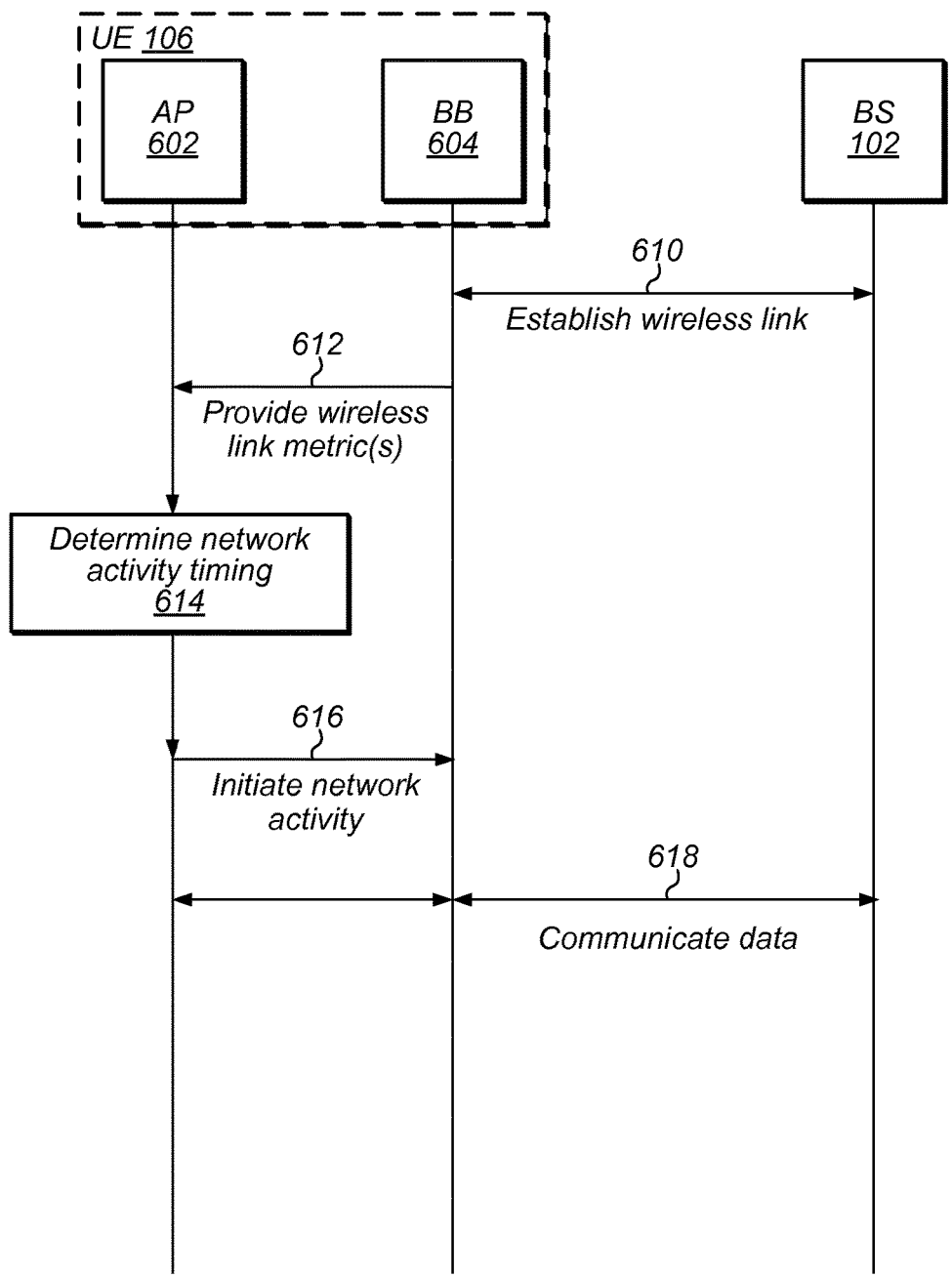
FIG. 6 is a communication flow diagram illustrating an exemplary method for coalescing application data activity using baseband triggers, according to some embodiments.

FIG. 6—Communication Flow Diagram

Many different types of networking data exchanges may be used by networking applications. One possible distinction that may be made between types of networking data exchanges may be between foreground data exchanges and background data exchanges. Foreground data exchanges may be considered higher priority data exchanges, and may typically include user-initiated data exchanges, such as for voice- and video-calls, active game use, media applications, web-browsing, and/or any of various other uses. Background data exchanges may be considered lower priority data exchanges, and may include data exchanges which occur without explicit user initiation, such as for data synchronization purposes, location updates, application updates, and/or any of various other uses. In many instances, background data exchanges may have some degree of delay tolerance.

Wireless link usage, including cellular link usage, may (at least in some instances) cause a substantial portion of the total power consumption of a wireless device. Inefficient use of the wireless communication capabilities of a wireless device may increase the power consumption caused by such a wireless device's wireless communication operations. It may be common for a wireless device to be capable of improving the efficiency of its wireless communication by operating in a "connected mode" or a "connected state" in order to perform network data exchange, and operating in an "idle mode" or an "idle state" (in which power consumption is reduced) when data is not actively being exchanged.

According to some embodiments, a wireless device may enter the connected mode (e.g., from the idle mode) in a device-initiated manner by performing a random access procedure (RACH), or in a network-initiated manner as a result of receiving a paging message from its serving cell. For example, the wireless device may RACH to transition to the connected mode in order to communicate delay sensitive data if the wireless device is not already in the connected mode. Similarly, if the network has data to communicate to the wireless device, the network may page the wireless device to cause a transition to connected mode, so that the network may then be able to communicate the data to the wireless device.

Transitioning between the idle and connected modes/states may require a certain amount of signaling overhead, so at least in some instances the power usage and performance efficiency of a wireless device may be further increased by reducing the number of state transitions between the idle and connected modes/states. For example, consider a scenario in which a wireless device has transitioned to connected mode in order to perform networking activity for one application, such as might be triggered by delay sensitive network activity, such as keep-alives, network address translation (NAT) timers, etc. If networking activity for another application (e.g., delay tolerant network activity) is performed while the wireless device is still in connected mode, this may reduce signaling overhead and power consumption and increase network resource use efficiency compared to if the wireless device were to release the connection after completing the networking activity for the initial application then later transition back to connected mode to perform the networking activity for the second application.

Alternatively, or in addition, it may be possible to improve the power usage and performance efficiency of a wireless device by triggering delay tolerant network activity when link quality is good (e.g., even if the device is not already in the connected mode). For example, by utilizing a wireless link when its quality is good, it may be the case that data transfers can be completed more quickly and consume less power than if such data transfers are attempted when link quality is lower (e.g., poor or bad), e.g., as better link quality conditions may allow higher throughput communication and/or lower transmit power.

Given the potential delay tolerance of background data, it may (at least in some instances) be possible to coordinate network data activity for multiple applications to utilize the same connection based on baseband triggers (such as wireless link state and/or quality information) in a manner that may reduce power consumption and improve performance, thus potentially benefiting user experience. FIG. 6 is a communication/signal flow diagram illustrating an example method for such coalescing of application data activity using baseband triggers, according to some embodiments.

The scheme shown in FIG. 6 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 610, a wireless user equipment (UE) device 106 and a base station 102 may establish a wireless link. The wireless link may be a cellular link. The cellular link may be established according to any of various possible cellular communication technologies. Establishing the cellular link may include camping on a cell provided by the BS 102 in an idle mode, and/or may include operating in a connected mode. For example, according to certain cellular communication technologies the UE 106 may operate in either of a radio resource control (RRC) idle state or a RRC connected state with respect to the wireless link at any given time. The wireless link may transition between such idle- and connected-states any number of times, e.g., according to link conditions, data queued to be exchanged, and/or any of various other considerations.

The wireless link may be established with the BS 102 by a baseband processor (BB) 604 (e.g., in conjunction with associated radio/wireless communication circuitry) of the UE 106. The baseband processor may monitor and manage the wireless link between the UE 106 and the BS 102, which may include performing cell searches, cell measurements, cell selection, setting up and tearing down connected mode, transmitting and receiving data over the wireless link, and/or any of various other baseband operations.

The UE 106 may also include an application processor (AP) 602. The application processor may support user applications, including providing an operating environment for such applications (e.g., potentially including any or all of graphics processing, memory management, network interface capability with the baseband processor, and/or any of various other functions) and executing the applications themselves.

In 612, the BB 604 may provide one or more wireless link metrics to the AP 602. The information may be provided to a networking entity operating on the AP 602, at least in some instances. The wireless link metric(s) may include any of various types of information. As one possibility, the wireless link metric(s) may include link state information which indicates whether the wireless link is in the connected state or the idle state. Alternatively, or in addition, the link state information may indicate whether the wireless link is available at all. For example, in some instances one or more types of wireless communication service might be unavailable for data activity. Note that a wireless link may be considered "unavailable" for the purposes of the wireless link metrics, at least in some instances, under certain circumstances in which the wireless link may still be available for purposes other than data transmission; for example, in some scenarios, it may be the case that a wireless link is available for voice only and not for data, or might be available for emergency calls only. Alternatively, it may be the case that there may be no wireless link established at all for those types of wireless communication service.

As a still further possibility, the link state information may indicate a wireless link quality level (which may be based on any of various desired link quality measurements such as RSRP, RSRQ, RSCP, Ec/Io, SNR, etc., and may be defined in any of various possible manners, as desired) of the wireless link. In some instances, the wireless link quality level may be determined in a different way if the wireless link is in the idle mode than if the wireless link is in the connected mode. For example, as one possibility, in idle mode, link quality might be determined based on downlink channel conditions, an estimated throughput of the wireless link, and/or any of various other possible considerations. As another possibility, in connected mode, link quality may be determined based on random access procedure (RACH) failures, radio link failures (RLFs), actual throughput, retransmission level, power consumption, and/or any of various other possible considerations. In some instances, the wireless link quality level may be defined as having three levels (e.g., "good", "poor", and "bad"): a first level may indicate that link quality is above a predefined threshold, a second level may indicate that link quality is below the predefined threshold, and the third level may indicate that one or more RLFs and/or RACH failures have been recently observed. Any number of other levels and/or definitions may be used, as desired.

The wireless link metrics may be provided from the BB 604 to the AP 602 upon request and/or automatically, and may be provided in a periodic and/or aperiodic manner. As one possibility, certain wireless link metrics (e.g., wireless link state/quality metrics) may be generated by the BB 604 and provided to the AP 602 whenever one of the reported state variables changes. For example, if the wireless link transitions from the idle state to the connected state, this may trigger generation and provision of a wireless link metric report from the BB 604 to the AP 602. As another (additional or alternative) possibility, some or all wireless link metrics may be generated and provided from the BB 604 to the AP 602 at periodic intervals (e.g., even if no state variables have changed since a most recent report). Other algorithms for determining when the wireless link metrics are generated and provided from the BB 604 to the AP 602 are also possible.

In some instances, the networking entity may receive (e.g., as part of or in addition to) and/or store (e.g., based on wireless link metrics previously received) wireless link history information for the wireless link. For example, the networking entity may store information indicating previous cells (e.g., cell IDs) to which the wireless device has attached, previous wireless link durations (connected mode durations, durations of time attached to cells, etc.), historical estimated (potentially with standard deviation) and/or actual wireless link throughput, historical wireless link quality metrics, and/or any of various other information, for any desired period of time (e.g., on the order of seconds, minutes, hours, days, weeks, and/or any other desired scale). Such historical wireless link history information storage and use may also be depend and/or be associated with user location, e.g., if desired.

In some instances, the networking entity may also or alternatively query the BB 604 to request an estimate of the maximum achievable throughput of the wireless link. Such an estimate may or may not be available from the BB 604 in various scenarios, e.g., depending on the type of wireless link. For example, maximum achievable throughput estimation may be possible for BB 604 for certain types of wireless links (e.g., which operate according to certain wireless communication technologies, such as LTE) but not for other types of wireless links. The BB 604 may respond to such a query with a response indicating its estimate of the maximum achievable throughput of the wireless link, if available, or alternatively may indicate that such an estimate is not available.

The networking entity may also receive requests from various applications executing on the AP 602 to perform network activities, which may include foreground and/or background data activities. Such network activity requests may have vary in any number of characteristics, any or all of which may affect when network activity is initiated based on a given network activity requests. For example, different network activity requests may have different delay sensitivities. Some requested network activities (e.g., foreground activities) may be more delay intolerant, while other requested network activities (e.g., background activities) may be more delay tolerant. As another example, different network activities may be of different scopes: some may include large data transfers, while others may include small data transfers. At least in some instances, some or all network activity requests may indicate any timing constraints associated with those network activity requests, for example including whether a network activity request is a foreground or background data transfer, a window of time to complete the data transfer, etc.

In 614, the networking entity may determine (e.g., select or coordinate) timing for initiating requested network activities. The determined timing may be based at least in part on any constraints (e.g., due to delay sensitivity, etc.) of the requested network activities, and may also be based at least in part on the wireless link metrics, among various possible considerations.

In 616, the networking entity may initiate requested network activities according to the determined timing. This may include providing data corresponding to each requested network activity to the BB 604 at the time selected to initiate each requested network activity.

In 618, the BB 604 may communicate the data corresponding to each requested network activity with the BS 102. Note that this may include performing at least one uplink transmission and potentially also receiving one or more downlink transmissions for a given network activity; for example, in some instances a background data transfer network activity may include an initial uplink transmission to initiate (request) the background data transfer from an external source (e.g., an application server), following which downlink data transmission from the external source to the application that requested the network activity may occur, by way of the wireless link between the UE 106 and the BS 102. If the wireless link is in the connected state, the data communication may occur on the existing connection. If the wireless link is in the idle state, a transition to the connected state may occur (e.g., an RRC connection may be established) and the data communication may occur on the newly set up connection.

Note that the timing for initiating requested network activities may be determined by the networking entity executing on the AP 602 in any of various ways in view of the various possible considerations. In some instances, the networking entity may attempt to select (e.g., coordinate) network activity initiation timing such that multiple applications' networking activities are coalesced to minimize the number of RRC connections created and maximize use of those RRC connections. In some instances, the networking entity may furthermore attempt to select network activity initiation timing such that RRC connections are initiated at times when link quality is good and/or estimated available throughput is high, and/or to maximize use of existing RRC connections for which link quality is good and/or estimated available throughput is high.

For example, the networking entity may be configured such as to trigger initiation of multiple requested networking activities together when possible (e.g., given other constraints). As one possibility, this may include delaying initiation of requested network activities with sufficient (e.g., above a threshold) remaining delay tolerance if the wireless link is not already in the connected state (e.g., if the wireless link is in the idle state or unavailable). Once the wireless link transitions to the connected state, any or possibly all such network activities may be initiated (e.g., triggered together), thus potentially maximizing use of that connection. Note that initiating the network activities may include handling the network activities on behalf of the applications requesting the network activities, or providing notifications to the applications requesting the network activities to proceed, or some combination thereof, among various possibilities.

Note that any number of other considerations (e.g., based on the given constraints for each requested network activity) may also affect the network activity initiation timing, as desired. For example, if the delay tolerance of a requested network activity decays below a desired threshold while the wireless link remains in the idle state, this might trigger initiation of the requested network activity, which may in turn trigger a transition to the connected state. Note that in some instances this may in turn trigger initiation of other requested network activities which were previously delayed due to the wireless link being in the idle state.

As another possibility, if a certain number (e.g., at or above a desired threshold) of network activities have been requested and are being delayed due to the wireless link being in the idle state, and wireless link quality of the wireless link is good (e.g., above a desired threshold), this may be used as a condition to trigger initiation of the requested network activities.

As a still further possibility, in some instances a network activity initiation timing may be based at least in part on historical wireless link information. For example, for a large (e.g., above a desired size threshold) data transfer with is requested, the networking entity may select a time within the delay tolerance of the requested network activity during which good link conditions may occur, available throughput may be high, user activity may be minimal, and/or any of various other desired conditions may be predicted to exist based on the historical wireless link information. This may help minimize the impact of such large data transfers on user experience, increase the performance of such large data transfers, and/or reduce the power consumption of such large data transfers, in various scenarios.

In some instances, any number of additional connected mode metrics may be provided from the BB 604 to the AP 602 when the wireless link is in the connected state. Such information may be provided to the transmission control protocol (TCP) stack, as one possibility, and may be used to help coalesce TCP operations in view of the current condition of the wireless link, which may represent the "first hop" for a TCP connection.

For example, the connected mode metrics may include any of various uplink, downlink, and/or common uplink and downlink metrics. The uplink metrics may include any or all of effective bandwidth, maximum bandwidth, average queue size, minimum queue size, maximum queue size, minimum latency, average latency, maximum latency, a percentage of data lost, a metric (e.g., a percentage, or a level selected from multiple possible predefined levels such as high, medium, low, or none, among various possibilities) indicating how frequently packet retransmissions (e.g., potentially including L2 (RLC) retransmission and/or L1 (HARD) retransmission) occur, and/or any of various other possible uplink metrics. The downlink metrics may include any or all of effective bandwidth, maximum bandwidth, and/or any of various other possible downlink metrics. The common metrics may include a link quality metric (which may be based on RSRP, RSRQ, RSCP, SNR, Ec/Io, and/or any of various other measurements, e.g., depending on wireless link type among various other possible considerations), an idle inactivity time parameter (e.g., indicating an amount of inactivity time remaining until the connection is released and the wireless link transitions to idle), a connection backoff time (e.g., indicating an amount of backoff time enforced before establishing a new connection), and/or any of various other possible common metrics.

Any of a variety of TCP/IP stack operations may be influenced by such connected mode metrics under various circumstances, including determining whether and when to perform FIN retransmissions, TCP RST messages, TCP keep-alive and app keep-alive messages, when to delay background traffic, and/or to account for sleep duration for TCP timers. Such connected mode metrics may also be used in other TCP stack optimizations in some instances, for example for adaptive queue management and/or congestion avoidance.

In some instances, such connected mode metrics may be provided by the BB 604 as a connected mode report provided to a packet data protocol (PDP) driver on the AP 602, which may strip the PDP header and transfer the payload to the TCP stack using a kernel API. Such a connected mode report may not be generated if the AP 602 is asleep, and/or the connected mode metrics may not be generated if the TCP reports an empty buffer (i.e., a buffer status with a zero value), at least in some embodiments; this may help minimize overhead and avoid bringing up a dormant bus.

Thus, according to the techniques described herein, it may be possible to coalesce or merge network activities of multiple applications (e.g., AP clients) based on one or more baseband triggering conditions, which may result in more efficient RRC connection usage. Triggering the network activities of multiple applications together (e.g., to utilize an already established RRC connection, to establish an RRC connection at a time when link quality is good, and/or according to any of various possible triggers, as described previously herein), for example by concurrently providing notifications to each of one or more applications perform their network activities when a triggering condition occurs, may improve the coordination of application network activities in comparison to allowing each AP client to determine its own network activity timing without reference to the timing of other AP clients.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a radio;
a baseband processor (BB) operatively coupled to the radio; and
an application processor (AP) operatively coupled to the BB;
wherein the wireless UE device is configured to:
receive, at the AP, cellular link information from the BB, wherein the cellular link information indicates whether a cellular link of the wireless UE device is in a radio resource control (RRC) connected state or an RRC idle state, wherein the cellular link information further comprises an indication of link quality of the cellular link;
determine, by the AP, network activity timing for one or more applications based at least in part on the cellular link information; and
initiate, by the AP, network activity for the one or more applications according to the determined network activity timing; and
wherein the AP is further configured to:
delay initiating a network activity with delay tolerance above a delay tolerance threshold if the link quality of the cellular link is below a link quality threshold; and
initiate network activity with delay tolerance above the delay tolerance threshold if the link quality of the cellular link is above the link quality threshold.

2. The wireless UE device of claim 1, wherein the determining network activity timing for one or more applications based at least in part on the cellular link information comprises coalescing data for multiple applications to trigger when the cellular link is in a radio resource control (RRC) connected state.

3. The wireless UE device of claim 1, wherein the AP is further configured to:
delay initiating a network activity with delay tolerance above a delay tolerance threshold if the cellular link is in the idle state; and
initiate network activity with delay tolerance above the delay tolerance threshold if the cellular link is in the connected state.

4. The wireless UE device of claim 1, wherein the wireless UE device is further configured to:
receive, at the AP, updated cellular link information from the BB when a connectivity state of the cellular link changes.

5. The wireless UE device of claim 1, wherein the wireless UE device is further configured to:
provide, by the AP, a query to the BB, wherein the query requests information estimating a maximum achievable throughput of the cellular link;
receive, at the AP, a response to the query from the BB, wherein the response comprises the information estimating a maximum achievable throughput of the cellular link; and
wherein the determining network activity timing for one or more applications is also based at least in part on the information estimating a maximum achievable throughput of the cellular link.

6. The wireless UE device of claim 1, wherein the wireless UE device is further configured to:
store, by the AP, cellular link history information based on cellular link information received by the AP from the BB,
wherein the determining network activity timing for one or more applications is also based at least in part on the cellular link history information.

7. The wireless UE device of claim 1, wherein the wireless UE device is further configured to:
receive, at the AP, additional cellular link information from the BB while the cellular link is in the connected state; and
perform TCP operations based at least in part on the additional cellular link information.

8. A method, comprising:
by a networking entity executing on an application processor of a wireless user equipment (EE) device:

receiving one or more wireless link metrics corresponding to a wireless link from a baseband processor of the wireless EE device, wherein the one or more wireless link metrics indicate whether the wireless link is available or unavailable, wherein if the wireless link is available, the one or more wireless link metrics indicate whether the wireless link is in a radio resource control (RRC) connected state or a RRC idle state;

receiving a request to perform one or more network activities from each of one or more applications executing on the application processor of the wireless EE device;

selecting network activity timing for coalescing data associated with each of the requested one or more network activities based at least in part on the one or more wireless link metrics; and initiating each of the requested one or more network activities according to the selected network activity timing, wherein the selecting the network activity timing comprises determining to delay initiating a network activity if a delay tolerance value of the network activity is above a delay tolerance threshold and if the wireless link is unavailable or if the wireless link is in the idle state, wherein the selecting the network activity timing comprises determining to delay initiating a network activity if the wireless link quality is below a wireless link quality threshold.

9. The method of claim 8,
wherein the selecting network activity timing for coalescing data associated with each of the requested one or more network activities comprises coordinating at least a subset of the requested one or more network activities to be initiated together based on a triggering condition, wherein the triggering condition is based on the one or more wireless link metrics.

10. The method of claim 9,
wherein the triggering condition comprises a radio resource control (RRC) connection being established.

11. The method of claim 8,
wherein at least a subset of the requested one or more network activities comprise background data network activities,
wherein each background data network activity request comprises an indication of a delay tolerance of the background data network activity, and
wherein the selecting network activity timing for coalescing data associated with each of the requested one or more network activities is also based at least in part on the delay tolerance of the requested background data network activities.

12. The method of claim 8,
wherein the selecting network activity timing for coalescing data associated with each of the requested one or more network activities is also based at least in part on a scope of each requested network activity.

13. The method of claim 8,
wherein if the wireless link is available, the one or more wireless link metrics indicate a wireless link quality level of the wireless link.

14. The method of claim 13,
wherein the selecting the network activity timing comprises determining to coalesce data associated with multiple requested network activities if the wireless link is in the connected state.

15. The method of claim 8,
wherein the wireless link comprises a cellular link between the wireless UE device and a cellular base station.

16. A method, comprising:
by a baseband processing element of a wireless user equipment (UE) device:
generating cellular link state information indicating whether a cellular link of the wireless UE device is in a radio resource control (RRC) connected state or a RRC idle state; and
providing the cellular link state information to a networking entity executing on an application processor (AP) of the wireless UE device, wherein the cellular link information further comprises an indication of link quality of the cellular link,
wherein the cellular link state information is configured for coordinating timing of initiating network activities of applications executing on the application processor of the wireless UE device with times when the wireless UE device is in the RRC connected state; and
wherein the AP is further configured to:
delay initiating a network activity with delay tolerance above a delay tolerance threshold if the link quality of the cellular link is below a link quality threshold; and
initiate network activity with delay tolerance above the delay tolerance threshold if the link quality of the cellular link is above the link quality threshold.

17. The method of claim 16,
wherein the cellular link state information further indicates a cellular link quality level of the cellular link.

18. The method of claim 16, further comprising:
providing additional cellular link state information to a transmission control protocol (TCP) stack executing on the application processor of the wireless UE device when the wireless UE device is in the RRC connected state and the TCP stack has a non-zero buffer status.

19. The method of claim 16, further comprising:
receiving a query from the networking entity executing on the application processor, wherein the query requests information estimating a maximum achievable throughput of the cellular link;
estimating a maximum achievable throughput of the cellular link in response to the query; and
providing information indicating the estimated maximum achievable throughput of the cellular link to the networking entity executing on the application processor in response to the query.

* * * * *